United States Patent
Lujan et al.

(10) Patent No.: US 9,191,186 B1
(45) Date of Patent: Nov. 17, 2015

(54) DEVICE AND METHOD COMPENSATING FOR EDGE DISTORTIONS OF SERIAL DATA SIGNAL

(71) Applicant: Keysight Technologies, Inc., Minneapolis, MN (US)

(72) Inventors: Michael J. Lujan, Colorado Springs, CO (US); Keith C. Griggs, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/341,598

(22) Filed: Jul. 25, 2014

(51) Int. Cl.
*H04L 7/033* (2006.01)
*H04L 7/00* (2006.01)

(52) U.S. Cl.
CPC ................................. *H04L 7/0041* (2013.01)

(58) Field of Classification Search
CPC ...... H04B 17/14; H04B 1/707; H04B 17/101; H04B 17/19; H04B 17/20; H04B 1/713; H04B 1/40; H04B 3/141; H04B 1/0475; H04B 3/145; H04B 10/40; H04B 10/504; H04B 10/564; H04B 15/04; H04B 1/70715; H03L 7/18; H03L 2207/12; H03L 7/0995; H03L 7/00; H03L 7/093; H03L 7/0891; H03L 7/095; H03L 7/10; H03L 7/189; H03L 2207/50; H03L 7/1806; H03L 7/087; H03L 7/089; H03L 7/0893; H04L 25/0286; H04L 7/033; H04L 1/20; H04L 1/246; H04L 25/0262; H04L 25/0274; H04L 25/0284; H04L 25/03343
USPC ........ 375/371; 327/295, 237, 298; 381/56, 98
See application file for complete search history.

(56) References Cited

U.S. PATENT DOCUMENTS

| | | | |
|---|---|---|---|
| 8,683,254 B2 | 3/2014 | Webb, III et al. | |
| 8,693,885 B2 | 4/2014 | Ghiasi | |
| 2009/0168941 A1* | 7/2009 | Zhang et al. | 375/371 |
| 2010/0085099 A1* | 4/2010 | Ma | 327/295 |
| 2012/0176174 A1* | 7/2012 | Webb, III | 327/237 |
| 2013/0117477 A1 | 5/2013 | May et al. | |
| 2013/0195277 A1* | 8/2013 | Kannan et al. | 381/56 |

* cited by examiner

*Primary Examiner* — Eva Puente

(57) ABSTRACT

A device compensates for distortions of a serial data signal introduced by a communication channel in a serial communication system. The device includes main path, first and second delay paths, first and second pulse generators, and combiner. The first and second delay paths delay a tapped-off portion of the serial data signal by first and second delay amounts, respectively, where the first delay amount is less than a main path delay amount and the second delay amount greater the main path delay amount. The first and second pulse generators generate first and second compensation pulses in response to the serial data signal delayed by the first and second delay amounts, respectively. The combiner combines the first and second compensation pulses with the main path delayed serial data signal, where the first and second compensation pulses compensate for magnitude loss and nonlinear phase of the main path delayed serial data signal.

20 Claims, 4 Drawing Sheets

DEVICE AND METHOD COMPENSATING FOR EDGE DISTORTIONS OF SERIAL DATA SIGNAL

BACKGROUND

High speed serial communication systems are specified at a high level in terms of maximum data and error rates. Such specifications are generally dictated by limitations in components forming the communication channel, including a transmitting device, a receiving device, and the transmission medium between the transmitting and receiving devices. The communication channel components distort fast edges corresponding to transitions in serial data signals, for example, by introducing frequency dependent magnitude loss and frequency dependent group delay due to nonlinear phase.

Generally, a serial data signal includes high and low voltage levels, e.g., corresponding to "1s" and "0s", of the data modulated onto the serial data signal. A transition edge between a low voltage level and a high voltage level is referred to as a "rising edge," and a transition edge between a high voltage level and a low voltage level is referred to as a "falling edge," both of which may be considered as "fast edges" at high data rates. The time it takes for the serial data signal to fully transition from the low voltage level to the high voltage level may be referred to as "rise time," and the time it takes for the serial data signal to fully transition from the high voltage level to the low voltage level may be referred to as "fall time." For purposes of illustration, the description herein is directed to rising edge transitions and corresponding rise time, although the description may equally apply to falling edge transitions and corresponding fall time.

Exemplary distortions of rising edges of serial data signal are shown in FIGS. 1A and 1B, indicating the distorting effects of a communication channel with magnitude loss and with increasing group delay, respectively, although one communication channel may include both distortions. More particularly, FIG. 1A illustrates the effect on a rising edge of magnitude loss, where amplitudes of the frequencies composing the rising edge experience progressively more attenuation as frequency increases (while the group delay remains constant, for purposes of illustration). Ideally, a rising edge (particularly a fast edge) transitions from the low voltage level to the high voltage level substantially instantaneously (that is, rise time is approximately zero). The practical effect of magnitude loss on the rising edge in the time domain is an increase in rise time, indicated by shifting the substantially vertical rising edge 101 to a slower (sloped) transitioning rising edge 101' occurring over an expanded period of time.

FIG. 1B illustrates the effect on a rising edge of frequency dependent increasing group delay in a communication channel, where the frequencies of the rising edge experience progressively more time delay as frequency increases (while magnitude remains constant, for purposes of illustration). Again, the practical effect on the rising edge in the time domain is an increase in rise time, indicated by shifting the substantially vertical rising edge 111 to a slower (sloped) transitioning rising edge 111' occurring over an expanded period of time. Also, in the time domain, the higher frequency components present in the rising edge 111 are delayed more than the lower frequency components, thereby initially pushing the higher frequency components past the high voltage level, causing "overshoot" and subsequent oscillation ("ringing") before settling at the high voltage level of the rising edge 111'.

In general, both magnitude loss and increasing group delay (or nonlinear phase) present in a communication channel impose an upper limit on the frequencies that can be transmitted without excessive distortion (e.g., excessive "eye" closure in an eye diagram) and acceptable error rate. Thus, there is a need to compensate for magnitude losses and increased group delay otherwise introduced by a communication channel.

SUMMARY

In a representative embodiment, a device compensates for edge distortions of a serial data signal introduced by a communication channel in a serial communication system. The device includes a main path configured to communicate the serial data signal, output by a serializer, to the communication channel, the main path delaying the serial data signal by a main path delay amount; a first delay path configured to delay the serial data signal by a first delay amount that is less than the main path delay amount; a second delay path configured to delay the serial data signal by a second delay amount that is greater the main path delay amount; a first pulse generator configured to generate a first compensation pulse in response to the serial data signal delayed by the first delay amount; a second pulse generator configured to generate a second compensation pulse in response to the serial data signal delayed by the second delay amount; and a combiner configured to combine the first and second compensation pulses with the main path delayed serial data signal from the main path. The first compensation pulse and the second compensation pulse compensate for magnitude loss and nonlinear phase of the main path delayed serial data signal to be introduced by the communication channel.

In another representative embodiment, a device compensates for edge distortions of a serial data signal introduced by a communication channel in a serial communications system. The device includes a main path configured to communicate the serial data signal, output by a serializer, to the communication channel, the main path delaying the serial data signal by a main path delay; a first delay path configured to receive a tapped-off portion of the serial data signal, the first delay path comprising a first start path configured to delay the tapped-off portion of the serial data signal by a first delay amount to provide to a first start signal, and a first stop path configured to delay the tapped-off portion of the serial data signal by a second delay amount to provide a first stop signal; a second delay path configured to receive the tapped-off portion of the serial data signal, the second delay path comprising a second start path configured to delay the tapped-off portion of the serial data signal by a third delay amount to provide a second start signal, and a second stop path configured to delay the tapped-off portion of the serial data signal by a fourth delay amount to provide a second stop signal; a first pulse generator configured to generate a first compensation pulse, which begins in response to the first start signal from the first start path and ends in response to the first stop signal from the first stop path; a second pulse generator configured to generate a second compensation pulse, which begins in response to the second start signal from the second start path and ends in response to the second stop signal from the second stop path; and a combiner configured to combine the first and second compensation pulses with the main path delayed serial data signal from the main path to compensate for at least one of magnitude loss and nonlinear phase of the main path delayed serial data signal to be introduced by the communication channel.

In another representative embodiment, a method is provided for compensating for edge distortions of a serial data signal introduced by a communication channel in a serial communication system. The method includes delaying the serial data signal by a main path delay amount in a main path; delaying a portion of the serial data signal by a first delay amount in a first delay path, the second delay amount being greater the main path delay amount; delaying another portion of the serial data signal by a second delay amount in a second delay path, the second delay amount being greater the main path delay amount; generating a first compensation pulse in response to the portion of the serial data signal delayed by the first delay amount; generating a second compensation pulse in response to the other portion of the serial data signal delayed by the second delay amount; and combining the first and second compensation pulses with the main path delayed serial data signal from the main path. The first compensation pulse and the second compensation pulse compensate for magnitude loss and nonlinear phase of the main path delayed serial data signal to be introduced by the communication channel.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings. Generally, it is understood that the drawings and the various elements depicted therein are not drawn to scale.

Generally, various embodiments enable independent compensation of frequency dependent magnitude loss and increasing group delay (nonlinear phase), including overshoot and ringing. The compensation is particularly flexible in that widths of compensation pulses are not constrained to a unit interval (UI), which is the amount of time equal to the inverse of the data rate of the communication channel. In other words, the compensation pulses may be narrower than the unit interval, thus allowing for compensation at harmonic frequencies of the data rate. Also, in various embodiments, the compensation pulse widths, amplitudes, and polarities may be electrically programmable, enabling the spectrum of the compensation to be tuned to the loss characteristics of a particular communication channel. Delay of compensation pulses may also be programmable, enabling the compensation pulses to be placed at optimum times within the edge transition. The described techniques may be used in conjunction with other industry standard compensation techniques.

Figure 1A:
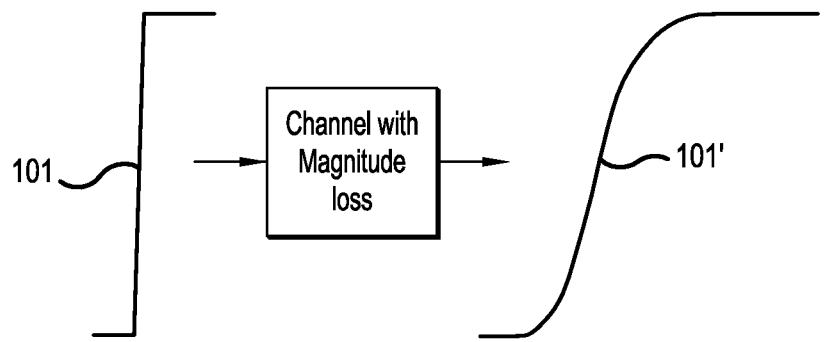
FIG. 1A is a diagram depicting effects of magnitude loss on a fast edge of a signal caused by communication channel distortion.
Figure 1B:
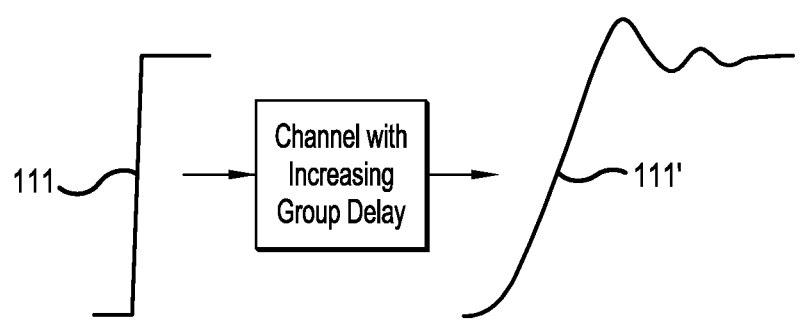
FIG. 1B is a diagram depicting effects of increasing group delay on a fast edge of a signal caused by communication channel distortion.
Figure 2:
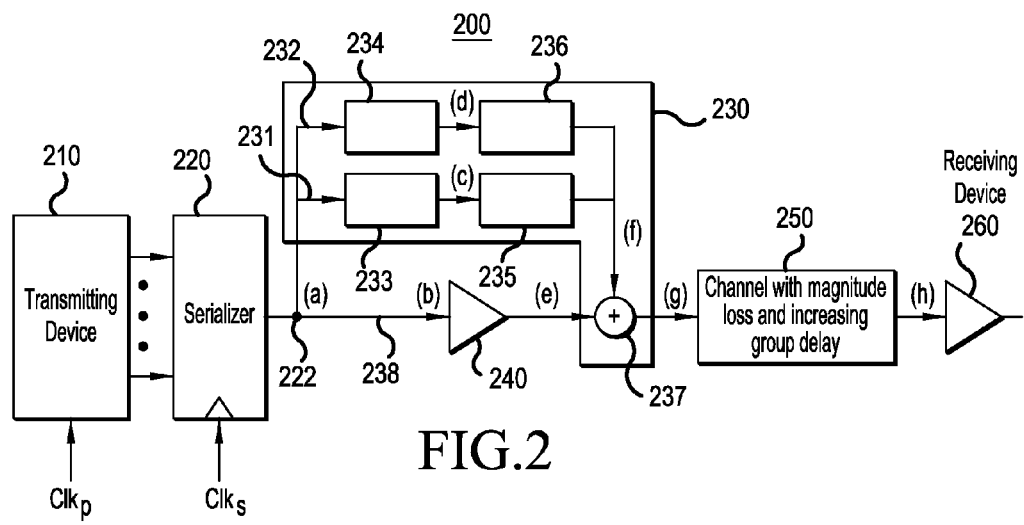
FIG. 2 is a simplified block diagram illustrating a device for compensating for distortions of a serial data signal in a communication system, according to a representative embodiment.

FIG. 2 is a block diagram illustrating a device for compensating for edge distortions of a serial data signal, according to a representative embodiment.

Referring to FIG. 2, communication system 200 depicts transmission of a data signal from a transmitting device 210 to a receiving device 260. The transmitting device 210 may be a central processing unit (CPU), for example, and is configured output parallel data in accordance with parallel clock signal $Clk_P$. The receiving device 260 may be a memory device, for example, and is configured to receive the serial data signal. Accordingly, the communication system 200 further includes serializer 220, distortion compensation device 230, output amplifier 240, and communication channel 250, all of which are arranged between the transmitting device 210 and the receiving device 260.

The serializer 220 generally converts parallel data input from the transmitting device 210 to serial data. The serializer 220 has a serial clock $Clk_S$, which controls the conversion to serial data and has a higher clock rate than that of the parallel clock $Clk_P$. For example, in the case of an eight-bit parallel data signal input to the serializer 220, the serial clock $Clk_S$ must have a clock rate at least eight times faster than the clock rate of the parallel clock $Clk_P$ so that all eight bits are output by the serializer 220 within a single clock period of the parallel clock $Clk_P$. The serial data signal undergoes preemptive compensation by the distortion compensation device 230 (for distortion that will be introduced by the communication channel 250) and amplified by the output amplifier 240 before entering the communication channel 250. The output amplifier 240 amplifies power to account for the length of the communication channel 250.

The distortion compensation device 230 includes multiple paths for delaying the serial data signal by different delay amounts. In the depicted embodiment, for example, the distortion compensation device 230 includes main path 238 configured to communicate the serial data signal from the serializer 220 to the output amplifier 240 (and ultimately to the communication channel 250). The main path 238 delays the serial data signal by a main path delay amount, which may be implemented by a main path delay unit (not shown) or may simply be inherent to the composition of the main path 238. For example, delay introduced by the power amplifier 240 may be included in the main path delay amount.

The distortion compensation device 230 further includes a first delay path 231 configured to delay a tapped-off portion of the serial data signal (provided via tap 222) by a first delay amount, and a second delay path 232 configured to delay the tapped-off portion of the serial data signal by a second delay amount. The first delay amount is introduced by first delay unit 233 in the first delay path 231, and the second delay amount is introduced by second delay unit 234 in the second delay unit 233. In the depicted embodiment, it is assumed that the first delay amount introduced by the first delay unit 231 is less than the main path delay amount, and that the second delay amount introduced by the second delay unit 232 is greater than the main path delay amount (and the first delay amount).

The distortion compensation device 230 further includes a first pulse generator 235 in the first delay path 231 following the first delay unit 233, and a second pulse generator 236 in the second delay path 232 following the second delay unit 234. The first pulse generator 235 is configured to generate a first compensation pulse in response to the tapped-off portion of the serial data signal delayed by the first delay amount. Since the first delay amount is less than the main path delay amount, the first compensation pulse occurs near the beginning of the rising edge of the serial data signal. That is, the first compensation pulse begins at approximately the same time as a transition edge of the main path delayed serial data signal begins, preemptively compensating for rise time degradation of the edge due to at least one of the magnitude loss or the nonlinear phase. The second pulse generator 236 is configured to generate a second compensation pulse in response to the tapped-off portion of the serial data signal delayed by the second delay amount. Since the second delay amount is greater than the main path delay amount, the second compensation pulse occurs after the beginning of the rising edge of the serial data signal. That is, the second compensation pulse begins at approximately the same time as the transition edge of the main path delayed serial data signal ends, preemptively compensating for at least one of overshoot, undershoot and ringing. The first compensation pulse has a corresponding first pulse width and first pulse amplitude, and the second compensation pulse has a corresponding second pulse width and second pulse amplitude. In an embodiment, the first and second pulse widths and pulse amplitudes may be variable, as discussed below. The distortion compensation device 230 further includes combiner (e.g., adder) 237, which consecutively combines the first and second compensation pulses with the main path delayed serial data signal from the main path 238.

Generally, the polarity of the first and second pulses may be negative (temporary pulsed decrease in voltage or current) or positive (temporary pulsed increase in voltage or current), depending on the particular situation or to meet specific requirements of various implementations, as would be apparent to one skilled in the art. In the depicted representative embodiment, the first compensation pulse is a negative pulse (negative polarity) and the second compensation pulse is a positive pulse (positive polarity) for purposes of illustration. The first pulse generator 235 may be referred to as a "preshoot" pulse generator because it generates a negative pulse that, when combined with the serial data signal by the combiner 237, causes an initial dip below the low voltage level at the beginning of the rise time, resulting in a more vertically oriented fast edge following the initial dip. The second pulse generator 236 may be referred to as an "overshoot" pulse generator because it generates a positive or negative pulse that, when combined with the serial data signal by the combiner 237, causes an overshoot or undershoot at the top of the edge at the end of the rise time, respectively, resulting in a more even transition from the vertically oriented fast edge to the high voltage level. The first compensation pulse and the second compensation pulse thereby offset the distortion that will be caused by magnitude loss and nonlinear phase (or, increasing group delay), respectively, of the main path delayed serial data signal introduced by the communication channel 250. Notably, the pulse widths of first and second compensation pulses are not constrained to a unit interval (UI), which is the amount of time equal to the inverse of the communication channel data rate (or the inverse of the serial clock $Clk_S$), enabling narrowing pulse widths.

Figure 3:
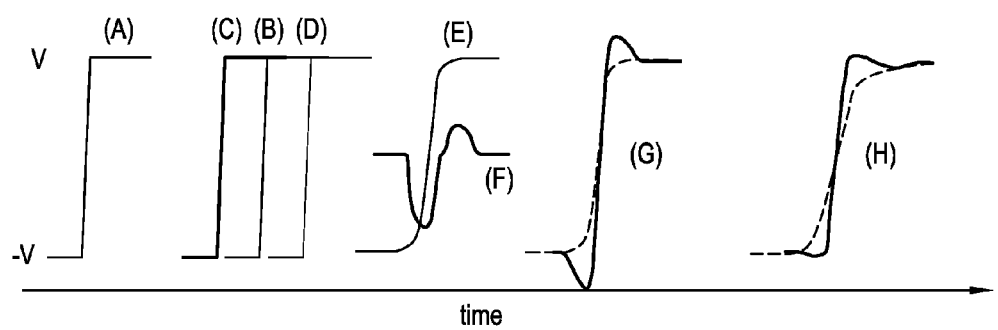
FIG. 3 is a signal diagram showing rising edges of the serial data signal at various locations in the communication system during the distortion compensation process, according to a representative embodiment.

FIG. 3 is a signal diagram showing rising edges of the serial data signal at various locations in the communication system 200 during the distortion compensation process, according to a representative embodiment.

Referring to FIG. 3, rising edge (or fast edge) (A) is a single bit transition of the serial data signal corresponding to position (a) at the output of the serializer 220 in FIG. 2. Because distortion of the serial data signal has not yet occurred, the transition of the rising edge (A) from the low voltage level to the high voltage level is clean in that the rising edge (A) is substantially vertical, the rise time is therefore quite short (indicating a desirable fast edge), there is no overshoot or ringing at the high voltage level. Rising edges (C), (B) and (D) correspond to the rising edge (A) after it has been delayed by the first delay amount, the main path delay amount and the second delay amount, respectively. In the time domain, the rising edge (C) occurs first since it corresponds to position (c) at the output of the first delay unit 233 in the first delay path 231, which has the shortest delay (the first delay amount). Likewise, the rising edge (B) occurs next since it corresponds to position (b) in the main path 238, which has the next shortest delay (the main path delay amount), and the rising edge (D) occurs last since it corresponds to position (d) at the output of the second delay unit 234 in the second delay path 232, which has the longest delay (the second delay amount). Notably, rising edges (B), (C) and (D) have the same shape (substantially vertical fast edge) and rise time as the rising edge (A) since there still has been no (or negligible) distortion of the serial data signal.

Rising edge (E) in FIG. 3 corresponds to position (e) at the output of the output amplifier 240 in the main path in FIG. 2. At this point, the output amplifier 240 causes some minor distortion of the serial data signal, as indicated by the rounded transition regions from the low voltage level to the rising edge, and from the rising edge to the high voltage level. Further, the slope of the rising edge becomes slightly less vertical, as discussed above, resulting in a longer rise time. Superimposed over the rising edge (E) in FIG. 3 is a compensation signal (F), including the first and second compensation pulses, which corresponds to position (f) at the combined outputs of the first and second pulse generators 235 and 236. In the time domain, the first compensation pulse (i.e., the larger of the two compensation pulses in the present example) occurs before the second compensation pulse in the compensation signal (F) since the first delay amount of the first delay path 231 is less than the second delay amount of the second delay path 232, as discussed above. The first and second compensation pulses may be considered current pulses for purposes of combining them, for ease of illustration. In a typical channel, the magnitude loss will dominate, resulting in a slower rise time. Any overshoot and ringing caused by increasing group delay in the channel are largely attenuated by magnitude loss. The second compensation pulse in the compensation signal (F) is shown with positive polarity to compensate for rise time degradation at the top of the edge due to magnitude loss in the channel. When overshoot and ringing is present in the signal, it is typically caused by excessive group delay in the transmitter and receiver components.

Rising edge (G) corresponds to position (g) in FIG. 2 at the output of the combiner 237, after the rising edge (E) has been combined with the compensation signal (F). The resulting rising edge (G) includes a negative preshoot portion corresponding to the first compensation pulse beginning at about the transition region from the low voltage level to the rising edge, and a positive overshoot portion corresponding to the second compensation pulse beginning at about the transition region from the rising edge to the high voltage level. Notably, the portion of the rising edge between the end of the preshoot portion to the beginning of the overshoot portion is more vertical than the distorted rising edge (corresponding to the rising edge (E), and indicated by a dashed curve).

From the position (g) in FIG. 2, the serial data signal passes through the communication channel 250, which introduces the magnitude loss and increasing group delay. Rising edge (H) in FIG. 3 corresponds to position (h) at the output of the communication channel 250, before being input to the receiving device 260. The affects of distortion caused by the communication channel 250 on the rising edge (G) have been largely negated by the pulsed compensation signal (F), which modified the rising edge (E) to provide the rising edge (G) preemptively compensating for the distortion. Comparing the rising edge (H) with the rising edge (G), the preshoot portion of the rising edge (G) offsets the effects of magnitude loss, resulting in a more vertical rising edge than the sloped rising edge that would otherwise have occurred (indicated by the dashed curve). Also, the overshoot portion of the rising edge (G) offsets the effects of magnitude loss at the top of the edge. The resulting rising edge (H) therefore includes a substantially vertical rising edge (and short rise time) and a relatively smooth transition from the rising edge to a stable high voltage level. The first and second compensation pulses thereby compensate for the magnitude loss of the serial data signal, which enables an increased data rate of the serial data signal. If, in the above example, excessive overshoot, due to increasing group delay, was present in the signal, the second compensation pulse can be inverted (to have negative polarity) to compensate for this overshoot.

In the embodiment discussed above with reference to FIGS. 2 and 3, the first and second compensation pulses are essentially fixed in duration (pulse width) and magnitude (pulse amplitude). That is, the first compensation pulse triggered by the rising edge in the serial data signal delayed by the first delay amount has a first predetermined duration and magnitude, and the second compensation pulse triggered by the rising edge in the serial data signal delayed by the second delay amount has a second predetermined duration and magnitude.

However, in alternative embodiments, the duration and/or the magnitude of the first and second compensation pulses may be independently adjustable. For example, in an embodiment, a compensation pulse generated in a delay path may begin in response to a rising edge delayed by a first delay amount and end in response to the rising edge delayed by a second delay amount (longer than the first delay amount). The duration of the compensation pulse is the difference between the first and second delay amounts, and can be controlled by adjusting one or both of the first and second delay amounts. Similarly, the magnitude of the compensation pulse may be adjusted using amplitude adjustment of the corresponding pulse generator, as discussed below, in addition to or instead of adjustments to the pulse duration.

Figure 4:
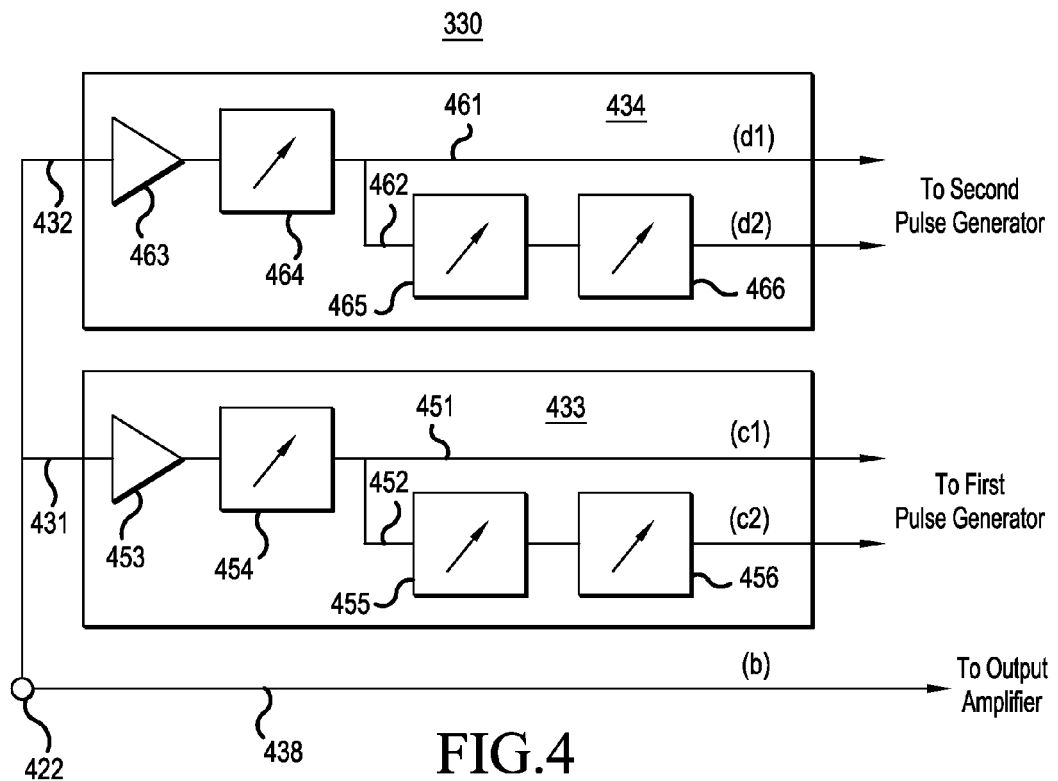
FIG. 4 is a simplified block diagram of a portion of a distortion compensation device having multiple delay units in each delay path for adjusting compensation pulses, according to a representative embodiment.

FIG. 4 is a simplified block diagram of a portion of a distortion compensation device having multiple delay units in each delay path for adjusting compensation pulses, according to a representative embodiment.

Referring to FIG. 4, distortion compensation device 330 includes multiple paths for delaying the serial data signal by different delay amounts, as discussed above with reference to distortion compensation device 230 in FIG. 2. In the depicted embodiment, for example, representative distortion compensation device 330 includes main path 438 configured to communicate the serial data signal from a serializer (e.g., serializer 220) to an output amplifier (e.g., output amplifier 240). The main path 438 delays the serial data signal by a main path delay amount, as discussed above with regard to main path 238. The distortion compensation device 330 further includes a first delay path 431 and a second delay path 432 configured to delay a tapped-off portion of the serial data signal provided via tap 422 by corresponding multiple delay amounts, as discussed below. In the depicted embodiment the total first delay amount of the first delay path 431 is less than the main path delay amount, and the total second delay amount of the second delay path 432 is greater than the main path delay amount.

The first delay path 431 includes representative first delay unit 433 configured to generate a first start signal at position (c1) output by first start path 451 and a first stop signal at position (c2) output by first stop path 452 for beginning and ending a corresponding first delay pulse, respectively. More particularly, the first delay unit 433 includes (optional) amplifier 453 and common delay element 454, which delays the tapped-off portion of the serial data signal by a first common delay amount (i.e., common to both the first start and stop paths 451 and 452). In the depicted embodiment, the first start path 451 does not include any additional delay elements, so the amount of delay corresponding to the first start signal is the same as the delay introduced by the common delay element 454 (first delay amount introduced by the first start path). In comparison, the first stop path 452 includes additional delay elements, including coarse delay element 455 and fine delay element 456, which introduce respective additional amounts of delay corresponding to the first stop signal, in addition to the delay introduced by the common delay element 454 (collectively referred to as the second delay amount introduced by the first stop path).

The first start signal and the first stop signal are transmitted from the first delay unit 433 to a first pulse generator (e.g., first pulse generator 235), which generates a first compensation pulse that begins in response to the first start signal (rising edge (C1)) and ends in response to the stop signal (rising edge (C2)). In other words, the width of the first compensation pulse is the difference in delay of the tapped-off portion of the serial data signal introduced by the first stop path 452 and the first start path 451. Since the total delay amount is less than the main path delay amount, as discussed above, the first compensation pulse occurs near the beginning of the rising edge of the serial data signal.

Each of the common delay element 454, the coarse delay element 455 and the fine delay element 456 are depicted as variable delay elements, enabling a user to adjust (e.g., in real time) the corresponding amounts of delay in order to more precisely obtain the desired pulse duration ultimately output by the first path 431, thereby increasing application flexibility. For example, the common delay element 454 may delay the tapped-off portion of the serial data signal by a delay amount generally less than the main path delay amount. The coarse delay element 455 may then be adjusted to obtain a rough pulse width of the first compensation pulse, which may then be fine tuned using the fine delay element 456. Of course, in alternative embodiments, one or more of the common delay element 454, the coarse delay element 455 and the fine delay element 456 may not be adjustable, thus introducing fixed delay amounts. Also, the first start path 451 may include one or more delay elements (fixed or adjustable) and/or the first stop path 452 may include a single delay element (fixed or adjustable) or more than two delay elements, without departing from the scope of the present teachings.

Similarly, the second delay path 432 includes representative second delay unit 434 configured to generate a second start signal at position (d1) output by second start path 461 and a second stop signal at position (d2) output by second stop path 462 for beginning and ending a corresponding second delay pulse, respectively. More particularly, the second delay unit 434 includes (optional) amplifier 463 and common delay element 464, which delays the tapped-off portion of the serial data signal by a second common delay amount (i.e., common to both the second start and stop paths 461 and 462). In the depicted embodiment, the second start path 461 does not include any additional delay elements, so the amount of delay corresponding to the second start signal is the same as the delay introduced by the common delay element 464 (third delay amount introduced by the second start path). In comparison, the second stop path 462 includes additional delay elements, including coarse delay element 465 and fine delay element 466, which introduce additional respective amounts of delay corresponding to the second stop signal, in addition to the delay introduced by the common delay element 464 (collectively referred to as fourth delay amount introduced by the second stop path).

The second start signal and the second stop signal are transmitted from the second delay unit 434 to a second pulse generator (e.g., second pulse generator 236), which generates a second compensation pulse that begins in response to the second start signal (rising edge (D1)) and ends in response to the second stop signal (rising edge (D2)). In other words, the width of the second compensation pulse is the difference in delay of the tapped-off portion of the serial data signal introduced by the second stop path 462 and the second start path 461. Since the total delay amount is greater than the main path delay amount, as discussed above, the second compensation pulse occurs after the beginning of the rising edge of the serial data signal.

As discussed above with regard to the first delay unit 433, each of the common delay element 464, the coarse delay element 465 and the fine delay element 466 are depicted as variable delay elements, enabling a user to adjust (e.g., in real time) the corresponding amounts of delay in order to more precisely obtain the desired pulse duration ultimately output by the second delay path 432, thereby increasing application flexibility. For example, the common delay element 464 may delay the tapped-off portion of the serial data signal by a delay amount generally greater than the main path delay amount. The coarse delay element 465 may then be adjusted to obtain a rough pulse width of the second compensation pulse, which may then be fine tuned using the fine delay element 466. Of course, in alternative embodiments, one or more of the common delay element 464, the coarse delay element 465 and the fine delay element 466 may not be adjustable, thus introducing fixed delay amounts. Also, the second start path 461 may include one or more delay elements (fixed or adjustable) and/or the second stop path 462 may include a single delay element (fixed or adjustable) or more than two delay elements, without departing from the scope of the present teachings. In addition, the main path 438 may include one or more delay elements (fixed or adjustable) in order to situate the main path delay amount between the first path delay amount and the second path delay amount, as discussed above.

Figure 5:
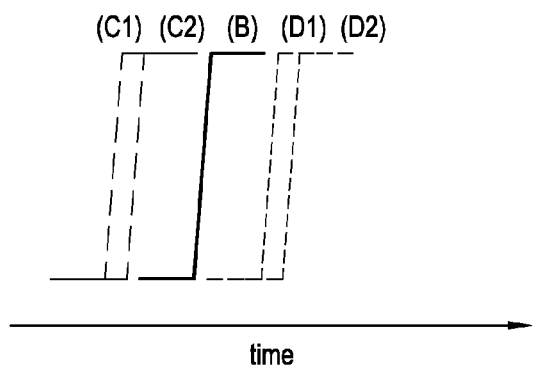
FIG. 5 is a signal diagram showing rising edges of the serial data signal at various locations in the distortion compensation device during the distortion compensation process, according to a representative embodiment.

FIG. 5 is a signal diagram showing rising edges of the serial data signal at various locations in the distortion compensation device during the distortion compensation process, according to a representative embodiment.

Referring to FIG. 5, rising edges (C1), (C2), (B), (D1) and (D2) correspond to the rising edge (A) (shown in FIG. 3) of the serial data signal having been delayed by different amounts, respectively. In the time domain, the rising edge (C1) corresponds to position (c1) at the output of the first start path 451, the rising edge (C2) corresponds to position (c2) at the output of the first stop path 452, the rising edge (B) corresponds to position (b) in the main path 438, the rising edge (D1) corresponds to position (d1) at the output of the second start path 461, and the rising edge (D2) corresponds to position (d2) at the output of the second stop path 462. Notably, the rising edges (C1), (C2), (B), (D1) and (D2) have substantially the same shape (substantially vertical fast edge) and rise time as the rising edge (A) in FIG. 3 since there distortion of the serial data signal has not yet occurred.

The space between the rising edge (C1) and the rising edge (C2) corresponds to the pulse width of the first compensation pulse, and the space between the rising edge (D1) and the rising edge (D2) corresponds to the pulse width of the second compensation pulse, discussed above. That is, the first pulse generator (e.g., first pulse generator 235) begins the first compensation pulse for addressing magnitude loss upon receipt of the rising edge (C1) and ends the first compensation pulse upon receipt of the rising edge (C2). Similarly, the second pulse generator (e.g., second pulse generator 236) begins the second compensation pulse for addressing nonlinear phase upon receipt of the rising edge (D1) and ends the second compensation pulse upon receipt of the rising edge (D2).

Figure 6:
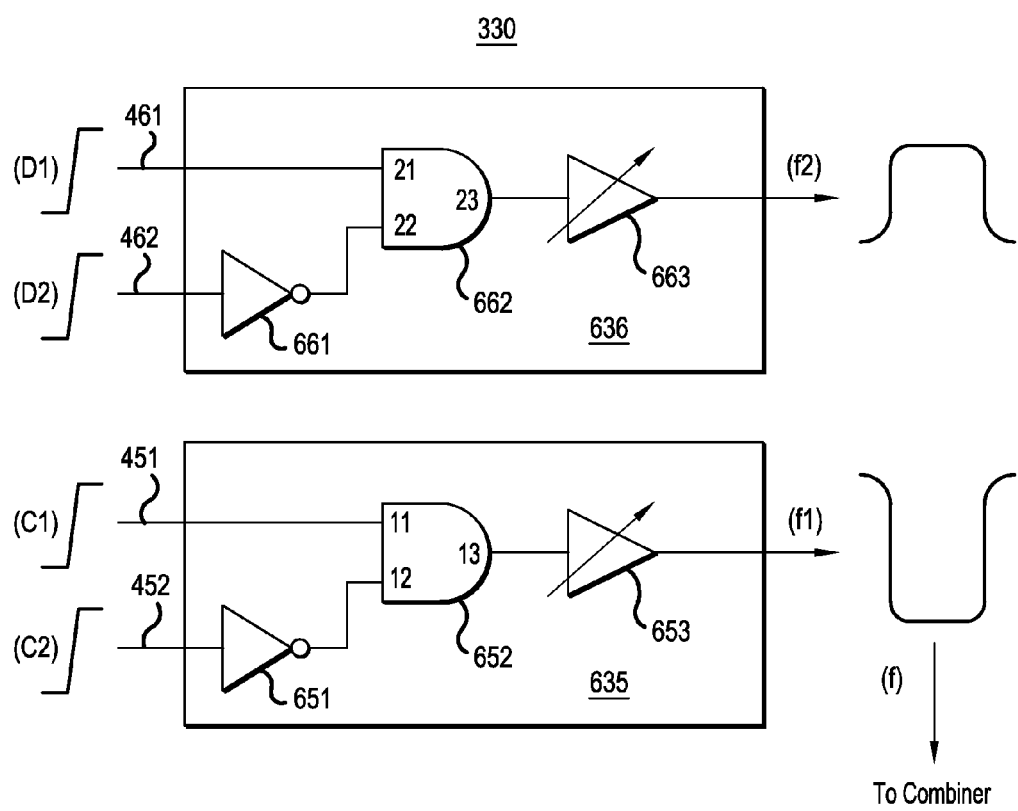
FIG. 6 is a simplified block diagram of a portion of a distortion compensation device having multiple pulse generators corresponding to multiple delay units, according to a representative embodiment.

FIG. 6 is a simplified block diagram of a portion of a distortion compensation device having multiple pulse generators corresponding to the multiple delay units in each delay path with the capability to adjust width and amplitude of compensation pulses, according to a representative embodiment.

Referring to FIG. 6, distortion compensation device 330 further includes multiple paths pulse generators for generating delayed pulses of various widths and amplitudes, as discussed above with reference to first and second delay units 233 and 234 distortion compensation device 230 in FIG. 2. In the depicted embodiment, for example, representative distortion compensation device 330 includes the continuation of first start path 451 transmitting rising edge (C1), the continuation of first stop path 452 transmitting rising edge (C2), the continuation of second start path 461 transmitting rising edge (D1), and the continuation of second stop path 462 transmitting rising edge (D2). (The main path 438 is not shown in FIG. 6.)

The distortion compensation device 330 further includes representative first pulse generator 635 configured to generate a first pulse signal (at position F1), and representative second pulse generator 636 configured to generate a second pulse signal (at position F2). The first and second pulse signals are combined at position (f), and added to the rising edge (E) by the combiner 237 as discussed above with reference to FIG. 2. More particularly, the first pulse generator 635 includes first inverter 651, first logic gate 652 (e.g., AND gate) and first variable amplifier 653 with inversion control, and the second pulse generator 636 similarly includes second inverter 661, second logic gate 662 (e.g., AND gate) and second variable amplifier 663 with inversion control.

The first inverter 651 inverts the rising edge (C2) from the first stop path 452. The first logic gate 652 receives at input 11 the rising edge (C1) from the first start path 451 and at input 12 the inverted rising edge (C2) from the first inverter 651. The logic result is provided at output 13 to the first variable amplifier 653, which amplifies the resulting first compensation pulse to the desired magnitude. In operation, for example, the input 11 of the first logic gate 652 is initially low and the input 12 is initially high (before receipt of either rising edge (C1) or (C2)), resulting in the output 13 being low. Upon arrival of rising edge (C1), the input 11 goes high and the input 12 remains high, resulting in the output 13 going high (marking the beginning of the first compensation pulse at position (f1)). Subsequently, upon arrival of rising edge (C2), the input 11 remains high and the input 12 goes low, resulting in the output 13 going low (marking the ending the first compensation pulse at position (f1)). In the depicted example, the resulting pulse has a negative polarity.

Similarly, referring to the second pulse generator 636, the second inverter 661 inverts the rising edge (D2) from the second stop path 462. The second logic gate 662 receives at input 21 the rising edge (D1) from the second start path 461 and at input 22 the inverted rising edge (D2) from the second inverter 661. The logic result is provided at output 23 to the second variable amplifier 663, which amplifies the resulting second compensation pulse to the desired magnitude. In operation, for example, the input 21 of the second logic gate 622 is initially low and the input 22 is initially high (before receipt of either rising edge (D1) or (D2)), resulting in output 23 being low. Upon arrival of rising edge (D1), the input 21 goes high and the input 22 remains high, resulting in the output 23 going high (marking the beginning of the second compensation pulse at position (f2)). Subsequently, upon arrival of rising edge (D2), the input 21 remains high and the input 22 goes low, resulting in the output 23 going low (marking the ending the second compensation pulse at position (f2)). In the depicted example, the resulting second compensation pulse has a positive polarity, as discussed above. It is understood that the first compensation pulse at position (f1) and the second compensation pulse at position (f2), although depicted for the sake of convenience as voltages, may be summed as currents to form the compensation signal (F).

Also, in the depicted example, the amplitude of the first compensation pulse is greater than the amplitude of the second compensation pulse, although the magnitudes may be varied by operation of the first and second variable amplifiers 653 and 663, respectively, depending on the particular situation or to meet specific requirements of various implementations, as would be apparent to one skilled in the art. A user may be able to adjust (e.g., in real time) the corresponding amplitude in order to more precisely obtain the desired pulse magnitudes ultimately output by the first and second pulse generators 635 and 636, thereby increasing application flexibility. Of course, alternative configurations of the first and second pulse generators may be incorporated without departing from the scope of the present teachings.

As mentioned above, the respective polarities of the first and second compensation pulses may be changeable (reversible) as well. That is, one or both of the first and second compensation pulses may be changed to the opposite polarities, respectively, either negative pulses (temporary decreases in voltage) or positive pulses (temporary increases in voltage). For example, the first compensation pulse may maintain the negative polarity, while the second compensation pulse may have either negative or positive polarity. Changing polarity may be accomplished using the first and second pulse generators.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

The invention claimed is:

1. A device for compensating for edge distortions of a serial data signal introduced by a communication channel in a serial communication system, the device comprising:
    a main path configured to communicate the serial data signal, output by a serializer, to the communication channel, the main path delaying the serial data signal by a main path delay amount;
    a first delay path configured to delay the serial data signal by a first delay amount that is less than the main path delay amount;
    a second delay path configured to delay the serial data signal by a second delay amount that is greater the main path delay amount;
    a first pulse generator configured to generate a first compensation pulse in response to the serial data signal delayed by the first delay amount;
    a second pulse generator configured to generate a second compensation pulse in response to the serial data signal delayed by the second delay amount; and
    a combiner configured to combine the first and second compensation pulses with the main path delayed serial data signal from the main path,
    wherein the first compensation pulse and the second compensation pulse compensate for magnitude loss and nonlinear phase of the main path delayed serial data signal to be introduced by the communication channel.

2. The device of claim 1, wherein the first compensation pulse has a corresponding first pulse width and first pulse amplitude that are variable, and the second compensation pulse has a corresponding second pulse width and second pulse amplitude that are variable.

3. The device of claim 2, wherein at least one of the first pulse width and the second pulse width is less than a unit interval, which is an inverse of a data rate of the communication channel.

4. The device of claim 1, wherein the first compensation pulse occurs before the second compensation pulse begins.

5. The device of claim 4, wherein the first compensation pulse begins at approximately the same time as a transition edge of the main path delayed serial data signal begins, preemptively compensating for rise time degradation of the edge due to at least one of the magnitude loss or the nonlinear phase.

6. The device of claim 5, wherein the second compensation pulse begins at approximately the same time as the transition edge of the main path delayed serial data signal ends, preemptively compensating for at least one of overshoot, undershoot and ringing.

7. The device of claim 6, wherein the overshoot or the undershoot is due to the nonlinear phase.

8. The device of claim 1, wherein compensating for the magnitude loss and the nonlinear phase of the serial data signal enables an increased data rate of the serial data signal.

9. The device of claim 1, wherein each of the first delay amount corresponding to the first compensation pulse and the second delay amount corresponding to the second compensation pulse is independently adjustable.

10. The device of claim 1, wherein a polarity of each of the first compensation pulse and the second compensation pulse is reversible.

11. A device for compensating for edge distortions of a serial data signal introduced by a communication channel in a serial communications system, the device comprising:
    a main path configured to communicate the serial data signal, output by a serializer, to the communication channel, the main path delaying the serial data signal by a main path delay;
    a first delay path configured to receive a tapped-off portion of the serial data signal, the first delay path comprising a first start path configured to delay the tapped-off portion of the serial data signal by a first delay amount to provide to a first start signal, and a first stop path configured to delay the tapped-off portion of the serial data signal by a second delay amount to provide a first stop signal;
    a second delay path configured to receive the tapped-off portion of the serial data signal, the second delay path comprising a second start path configured to delay the tapped-off portion of the serial data signal by a third delay amount to provide a second start signal, and a second stop path configured to delay the tapped-off portion of the serial data signal by a fourth delay amount to provide a second stop signal;
    a first pulse generator configured to generate a first compensation pulse, which begins in response to the first start signal from the first start path and ends in response to the first stop signal from the first stop path;
    a second pulse generator configured to generate a second compensation pulse, which begins in response to the second start signal from the second start path and ends in response to the second stop signal from the second stop path; and
    a combiner configured to combine the first and second compensation pulses with the main path delayed serial data signal from the main path to compensate for at least one of magnitude loss and nonlinear phase of the main path delayed serial data signal to be introduced by the communication channel.

12. The device of claim 11, wherein the first delay path comprises a first delay unit including a first common delay element, common to both the first start path and the first stop path, which delays the tapped-off portion of the serial data signal by a first common delay amount, and at least one additional first delay element in the first stop path, which further delays the tapped-off portion of the serial data signal by a first additional delay amount.

13. The device of claim 12, wherein the second delay path comprises a second delay unit including a second common delay element, common to both the second start path and the second stop path, which delays the tapped-off portion of the serial data signal by a second common delay amount, and at least one of additional second delay element in the second stop path, which further delays the tapped-off portion of the serial data signal by a second additional delay amount.

14. The device of claim 13, wherein the first common delay amount is equal to the first delay amount, the first common delay amount and the first additional delay amount is equal to the second delay amount, the second common delay amount is equal to the third delay amount, and the second common delay amount and the second additional delay amount is equal to the fourth delay amount.

15. The device of claim 13, wherein at least one of the first common delay element, the additional first delay element, the second common delay element, and the additional second delay element is adjustable.

16. The device of claim 11, wherein at least one of a width of the first compensation pulse and a width of the second compensation pulse is less than a unit interval, which is an inverse of a data rate of the communication channel.

17. A method for compensating for edge distortions of a serial data signal introduced by a communication channel in a serial communication system, the method comprising:
    delaying the serial data signal by a main path delay amount in a main path;
    delaying a portion of the serial data signal by a first delay amount in a first delay path, the first delay amount being less than the main path delay amount;
    delaying another portion of the serial data signal by a second delay amount in a second delay path, the second delay amount being greater the main path delay amount;
    generating a first compensation pulse in response to the portion of the serial data signal delayed by the first delay amount;
    generating a second compensation pulse in response to the other portion of the serial data signal delayed by the second delay amount; and
    combining the first and second compensation pulses with the main path delayed serial data signal from the main path,
    wherein the first compensation pulse and the second compensation pulse compensate for at least one of magnitude loss and nonlinear phase of the main path delayed serial data signal to be introduced by the communication channel.

18. The method of claim 17, wherein the first delay amount comprises a first start signal provided by a first common delay amount and a first stop signal provided by the first common delay amount and a first additional delay amount, and
    wherein the second delay amount comprises a second start signal provided by a second common delay amount and a second stop signal provided by the second common delay amount and a second additional delay amount.

19. The method of claim 18, wherein a width of the first compensation pulse is determined by a difference between the first common delay amount and a sum of the first common delay amount and the first additional delay amount; and
    wherein a width of the second compensation pulse is determined by a difference between the second common delay amount and a sum of the second common delay amount and the second additional delay amount.

20. The method of claim 17, wherein the first compensation pulse has negative polarity and the second compensation pulse has positive polarity.

* * * * *